United States Patent
Nitta et al.

(10) Patent No.: US 8,586,257 B2
(45) Date of Patent: Nov. 19, 2013

(54) FUEL CELL SYSTEM THAT PROVIDES HIGH GRADE HEAT TO AN ABSORPTION CHILLER

(75) Inventors: Bhimashankar V. Nitta, Ellington, CT (US); Brian Chakulski, Vernon, CT (US); Benoit C. Olsommer, South Glastonbury, CT (US); Robert J. Braun, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/397,950

(22) Filed: Feb. 16, 2012

(65) Prior Publication Data

US 2012/0164548 A1    Jun. 28, 2012

Related U.S. Application Data

(62) Division of application No. 12/279,602, filed as application No. PCT/US2006/011359 on Mar. 30, 2006, now abandoned.

(51) Int. Cl.
*H01M 8/04* (2006.01)

(52) U.S. Cl.
USPC .................. 429/434; 429/435; 429/437

(58) Field of Classification Search
USPC ......... 429/433, 434, 435, 437, 440, 442, 456, 429/455, 500; 165/138, 104.33
See application file for complete search history.

(56) References Cited

U.S. PATENT DOCUMENTS

| 4,554,223 A | * | 11/1985 | Yokoyama et al. ........... 429/420 |
| 5,449,568 A | * | 9/1995 | Micheli et al. ................. 429/434 |

FOREIGN PATENT DOCUMENTS

| JP | 2001-57222 | * | 2/2001 | ............. H02J 15/00 |
| JP | 2001057222 A | | 2/2001 | |

OTHER PUBLICATIONS

International Preliminary Report on Patentability for International application No. PCT/US06/11359 mailed Oct. 9, 2008.
International Search Report and Written Opinion of the International Searching Authority for International application No. PCT/US06/11359 mailed Aug. 21, 2006.

* cited by examiner

Primary Examiner — Raymond Alejandro
(74) Attorney, Agent, or Firm — Carlson, Gaskey & Olds

(57) ABSTRACT

A standard phosphoric acid fuel cell power plant has its heat exchanger removed such that a higher temperature coolant flow can be directed from the system to the generator of an absorption chiller to obtain improved efficiency in the chiller. In one embodiment, the higher temperature coolant may flow directly from the fuel cell stack to the generator and then back to the high temperature coolant loop. Either a double effect absorption chiller or a single effect absorption chiller may be used.

5 Claims, 5 Drawing Sheets

FUEL CELL SYSTEM THAT PROVIDES HIGH GRADE HEAT TO AN ABSORPTION CHILLER

CROSS-REFERENCE TO RELATED APPLICATIONS

This application is a divisional of the now-abandoned U.S. patent application Ser. No. 12/279,602 filed Aug. 15, 2008, which is the national stage application of International Application No. PCT/US06/11359, filed Mar. 30, 2006.

BACKGROUND OF THE INVENTION

This invention relates generally to fuel cell power plants and, more particularly, to a method and apparatus for using an absorption chiller in combination therewith.

A fuel cell is an electrochemical cell which consumes fuel and an oxidant on a continuous basis to generate electrical energy. The fuel is consumed at an anode and the oxidant at a cathode. The anode and cathode are placed in electrochemical communication by an electrolyte. One typical fuel cell employs a phosphoric acid electrolyte. The phosphoric acid fuel cell uses air to provide oxygen as an oxidant to the cathode and uses a hydrogen rich stream to provide hydrogen as a fuel to the anode. After passing through the cell, the depleted air and fuel streams are vented from the system on a continuous basis.

A typical fuel cell power plant comprises one or more stacks of fuel cells, the cells within each stack being connected electrically in series to raise the voltage potential of the stack. A stack may be connected in parallel with other stacks to increase the current generating capability of the power plant. Depending upon the size of the power plant, a stack of fuel cells may comprise a half dozen cells or less, or as many as several hundred cells. Air and fuel are usually fed to the cells by one or more manifolds per stack.

In each of the fuel cells, waste heat is a by-product of the reforming process for conversion of fuel to a hydrogen rich steam, electrochemical reactions and the heat generation associated with current transport within the cell components. Accordingly, a cooling system must be provided for removing the waste heat from a stack of fuel cells so as to maintain the temperature of the cells at a uniform level which is consistent with the properties of the material used in the cells and the operating characteristics of the cells. This has typically been accomplished by circulating a coolant, such as water, through the fuel cell stack to cool the cells to the required level, with the temperature of the water emanating from the fuel stack being relatively high (i.e. over 300° F.). While temperature of 300-350° F. are acceptable for industrial or large campus customers, which are relatively few in number, those temperature are too hot for most main stream commercial customers. Thus, low grade and high grade customer heat exchangers were added to ensure ease of integration with most commercial customer heat transfer equipment. That is, these heat exchangers and cooling loops were added to reduce the temperature down to a useful level (i.e. around 150° F.) for ordinary boiling uses such as boiler feed water, heating coils in the air handling systems, radiant heating, hydraulic heating, laundry and household use. These exchanges also served the purpose of protecting the cell stack from possible contaminants in the customer side loops. Such a design has thus become the standard in the industry, with all fuel cell plants being sold with the associated heat exchangers installed as standard equipment.

One application that has recently come into use is that of applying the hot water available as a low grade heat source to drive absorption chillers for the generation of chilled water for space cooling. While this does make use of the waste heat from the fuel cell power plant, it has been found to be a relatively inefficient use of an absorption chiller. That is, the major drawback with using customer heat exchangers is that the addition of another heat transfer loop leads to thermal losses and driving force losses, as these external loops must operate at lower temperatures.

SUMMARY OF THE INVENTION

Briefly, in accordance with one aspect of the invention, the heat exchanger is removed from the standard equipment provided with a fuel cell generating plant such that the temperature of the waste heat emanating therefrom is elevated from a relatively low to an intermediate temperature which, when applied to an absorption chiller, is more efficient in the chilling of water.

In accordance with another aspect of the invention, rather than passing through the heat exchange process to reduce the temperature of the stack coolant to a relatively low or intermediate temperature, the high temperature coolant is caused to flow directly to the absorption chiller generator so as to provide greater efficiency in the operation of the chiller.

In accordance with another aspect of the invention, a single effect absorption chiller is replaced with a double effect absorption chiller, with the high temperature stack coolant then flowing directly to the chiller generator, thereby resulting in even greater efficiencies.

In the drawings as hereinafter described, a preferred embodiment and modified embodiments are depicted; however, various other modifications and alternate constructions can be made thereto without departing from the true spirit and scope of the invention.

DETAILED DESCRIPTION OF THE INVENTION

Figure 1:
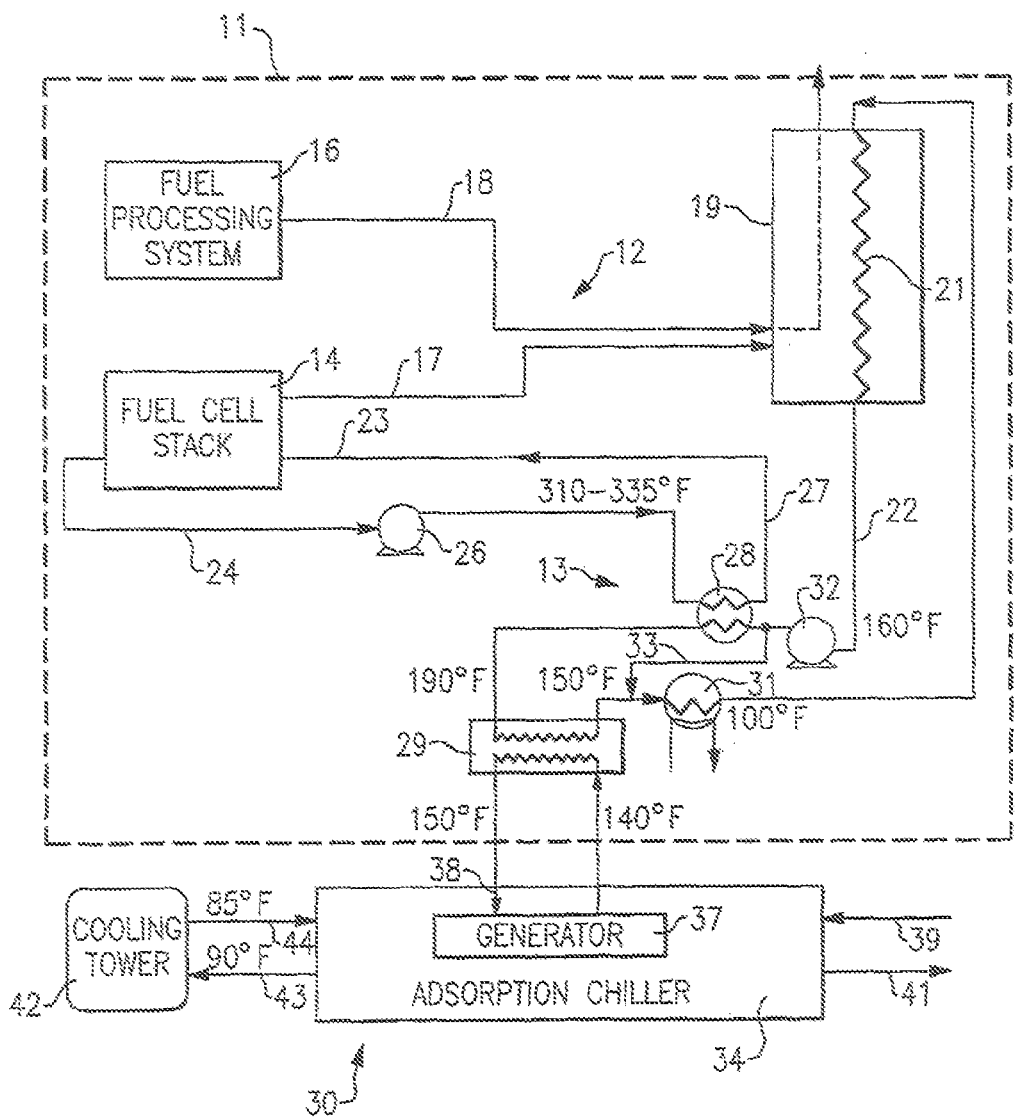
FIG. 1 is a schematic illustration of a fuel cell power plant being used in combination with a single effect adsorption chiller in accordance with the prior art.

Referring now to FIG. 1, a power plant apparatus 11 is shown within the dashed lines and includes a power generation portion 12 and a cooling portion 13. The power generation portion 12 includes a fuel cell stack 14 and a fuel processing system 16 both of which produce waste heat, which passes through the respective exhaust ducts 17 and 18 to a plant exhaust stack 19 where it is discharged to ambient. Within the stack 19 is a heat exchanger 21 to which is transferred a portion of the heat from the exhaust ducts 17 and 18.

Such heat is considered to be low grade heat that is passed to the low grade heat circulation loop 22 as part of the cooling portion 13 of the system. The temperature of the circulating liquid passing through the heat exchanger 21 is on the order of 160° F.

In order to reduce the high temperatures within the fuel cell stack 14, a liquid, such as water, is passed by way of an inlet line 23, into and through the fuel cell stack 14 and out an outlet line 24, with a pump 26 maintaining the flow through the closed loop 27. The liquid coolant in this loop is at a relatively high temperature (i.e. in the range of 310-335° F.), and is considered to be high grade heat. The closed loop 27 is thus considered to be a high grade heat loop.

For purposes of this description, high grade heat is herein defined as waste heat from a fuel cell power plant that is transferred to a coolant loop with the coolant being heated to a temperature level of about or over 250° F., while low grade heat is defined as waste heat from a fuel cell power plant that is transferred to a coolant loop with the coolant being heated to a temperature level of about 140° F.

Within the cooling portion 13 of the system, there are provided three heat exchangers, 28, 29, and 31 within the circulation loop 22 and a pump 32 for maintaining the flow within the loop 22. The primary heat exchanger 28 is a liquid to liquid heat exchanger of the counter-flow type such as a concentric tube heat exchanger. Its function is to transfer some of the heat from the fuel cell stack coolant, so that it is cooled from a relatively high temperature (i.e., 310-335° F.) to a temperature of about 250° F., which coolant is then circulated back into the fuel cell stack 14.

Within the circulation loop 22, a liquid coolant flowing through the primary heat exchanger 28 picks up heat and is heated to a temperature from around 160° F. to around 190°. A secondary heat exchanger 29 is provided to reduce the temperature thereof by a heat exchange relationship with an auxiliary apparatus 30 as will be described.

As the liquid coolant in the circulation loop 22 passes through the secondary heat exchanger 29, the temperature is reduced from around 190° F. to around 150° F., after which it passes through the heat exchanger 31, which is an ambient heat rejection unit in the form of a liquid to air heat exchanger. As the coolant passes through this heat exchanger, its temperature is reduced from around 180° F. to around 100° F., with the rejected heat passing to the atmosphere.

In the event that an auxiliary apparatus 30 is not in operation, then it is necessary to shed as much of the heat as possible by way of the heat exchanger 31. A bypass line 33 is therefore provided to pass the coolant directly from the pump 32 to the ambient heat rejection unit 31.

Figure 2:
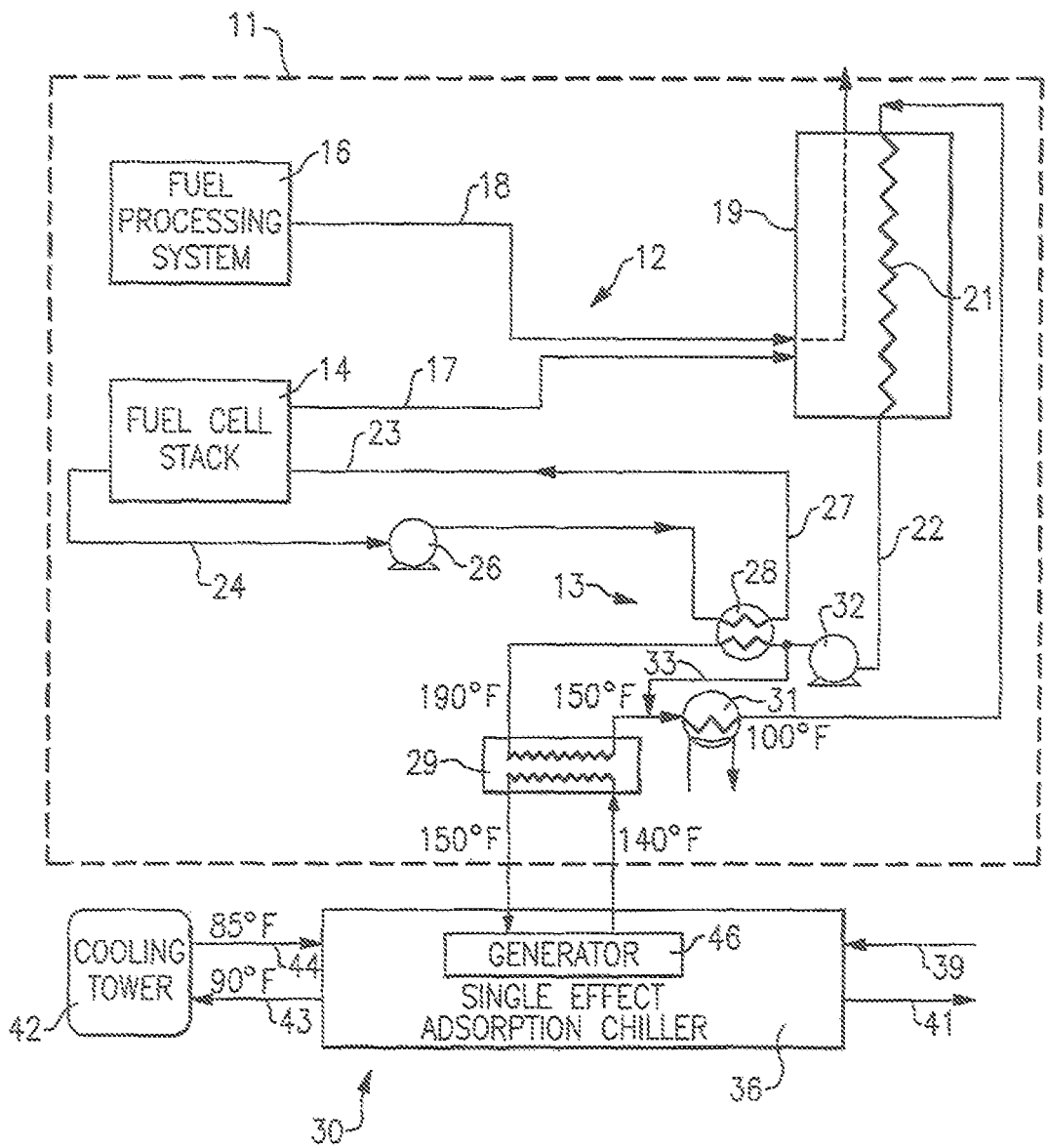
FIG. 2 is a schematic illustration of a fuel cell power plant as used in combination with a single effect absorption chiller in accordance with the prior art.

Considering now the auxiliary apparatus 30, one of the uses that has been made of the heat from the secondary heat exchanger 29 is that of driving an absorption chiller 34 as shown in FIG. 1 or a similar single effect absorption chiller 36 as shown in FIG. 2. In the case of the absorption chiller 34, the boiler or generator 37 is heated by the liquid in secondary loop 38 of the exchanger 29, with the temperature of the input flow of around 150° F. being reduced to around 140° F. at the outlet from the generator 37. The water to be chilled passes into the absorption chiller 34 by way of a line 39 and out by way of line 41. On the condenser side of the chiller 34, a cooling tower 42 is provided to cool the liquid flowing in the inlet line 43 from around 90° F. to around 85° F. as it flows in the outlet line 44.

In respect to the boiler or generator 46 of the single effect absorption chiller shown in FIG. 2, the temperatures of the various liquids passing into and out of the chiller 46 are substantially the same as those for the absorption chiller as shown in FIG. 1.

It has been recognized by the applicant that neither of the absorption chiller of FIG. 1 nor the single effect absorption chiller 36 of FIG. 2 operate very efficiently. It has been found in each case, that a single chiller plant will provide around twenty refrigeration tons of cooling capacity with a COP (coefficient of performance) of about 0.6 where the COP is the ratio of chilling delivered by the chiller to the heat input to the chiller, all in common thermal units.

Considering now the auxiliary apparatus 30, one of the uses that has been made of the heat from the secondary heat exchanger 29 is that of driving an adsorption chiller 34 as shown in FIG. 1 or a similar single effect absorption chiller 36 as shown in FIG. 2. In the case of the adsorption chiller 34, the boiler or generator 37 is heated by the liquid in secondary loop 38 of the exchanger 29, with the temperature of the input flow of around 150° F. being reduced to around 140° F. at the outlet from the generator 37. The water to be chilled passes into the adsorption chiller 34 by way of a line 39 and out by way of line 41. On the condenser side of the chiller 34, a cooling tower 42 is provided to cool the liquid flowing in the inlet line 43 from around 90° F. to around 85° F. as it flows in the outlet line 44.

In respect to the boiler or generator 46 of the single effect absorption chiller shown in FIG. 2, the temperatures of the various liquids passing into and out of the chiller 46 are substantially the same as those for the adsorption chiller as shown in FIG. 1.

It has been recognized by the applicant that neither of the adsorption chiller of FIG. 1 nor the single effect absorption chiller 36 of FIG. 2 operate very efficiently. It has been found in each case, that a single chiller plant will provide around twenty refrigeration tons of cooling capacity with a COP (coefficient of performance) of about 0.6 where the COP is the ratio of chilling delivered by the chiller to the heat input to the chiller, all in common thermal units.

Figure 3:
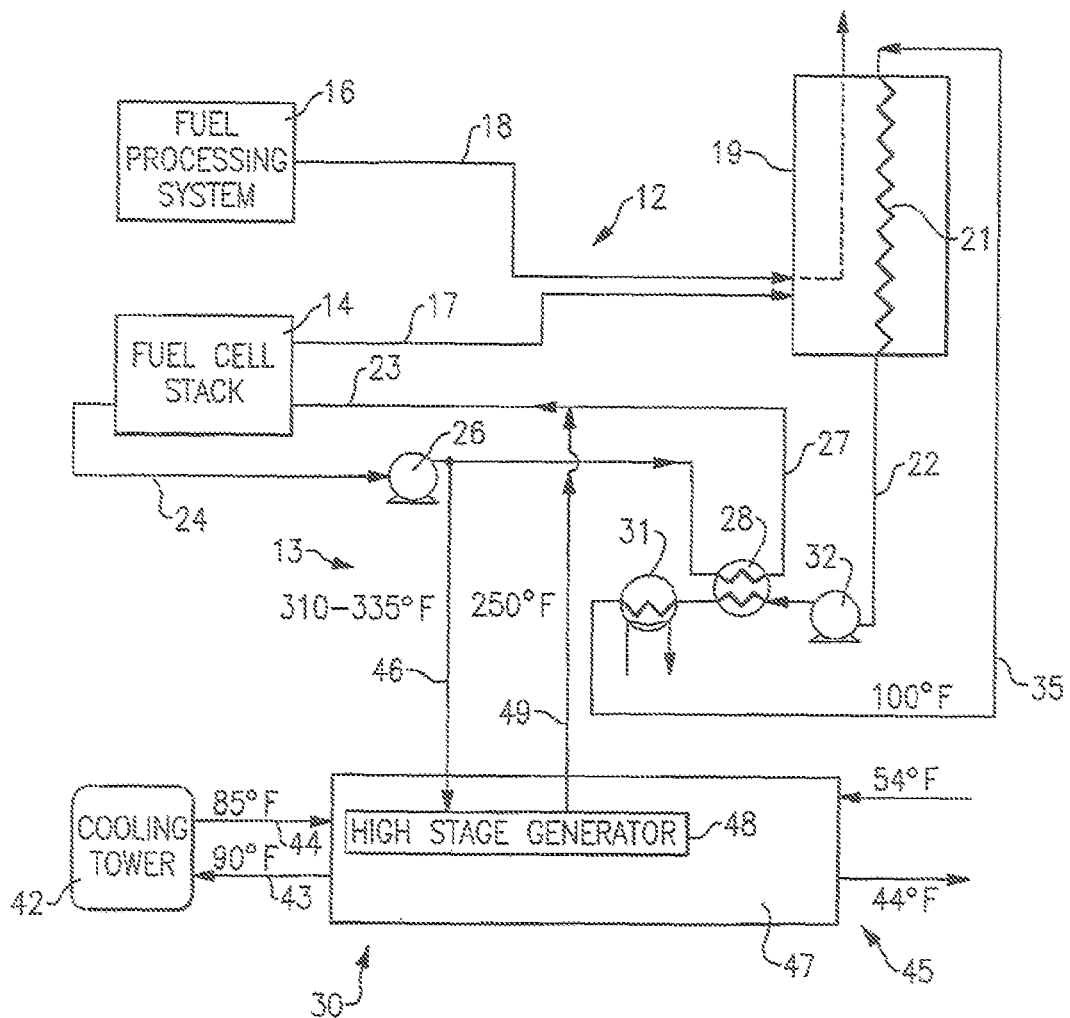
FIG. 3 is a schematic illustration of a fuel cell power plant as being used in combination with a double effect absorption chiller in accordance with one embodiment of the invention.

Referring now to FIG. 3, it will be seen that the power plant apparatus has been modified from its standard configuration by removing the secondary heat exchanger 29. Further, rather than the coolant from the fuel cell stack 14 first transferring its heat to the coolant in the circulation loop 22 by way of the primary heat exchanger 28 and then having the coolant in the circulation loop 22 being applied indirectly to the auxiliary apparatus 30 by way of the secondary heat exchanger 29, the high temperature (i.e. 310° F.-335° F.) coolant from the fuel cell stack is applied directly to an auxiliary apparatus 45 by way of line 46 as shown in FIG. 3. With this high temperature liquid, it is possible to use a different type of auxiliary apparatus 45 and one which is more efficient than the prior art auxiliary apparatus 30 as shown in FIGS. 1 and 2. Here, a double effect absorption chiller 47 with a high stage generator 48 is installed, with the high temperature liquid in line 46 providing the heat for the high stage generator 48. For such an arrangement, the applicant has found that a substantial improvement in cooling capacity can be obtained. For example, a single system has been found to provide 27-38 refrigeration tons as compared with twenty refrigerant tons of the prior art systems. Further, a COP greater than 1.0 has been obtained with such a system as compared with a COP of 0.6 for the prior art systems.

After the high temperature fluid has passed through the high stage generator 48 and had its temperature reduced to around 250° F., rather than being returned to the circulation loop 22 as in the prior art, it is caused to flow by line 49 directly to the closed loop 27, at a point downstream of the primary heat exchanger 28, as shown in FIG. 3. That fluid is combined with the other fluids in the closed loop 27 is now at a temperature of around 250° F. and is returned to the fuel cell stack 14 for the cooling thereof.

With the removal of the heat exchanger 29, the coolant liquid flowing from the heat exchanger 28 is now caused to flow directly to the heat exchanger 31 and then along line 35 to the plant exhaust stack 19 as shown.

Figure 4:
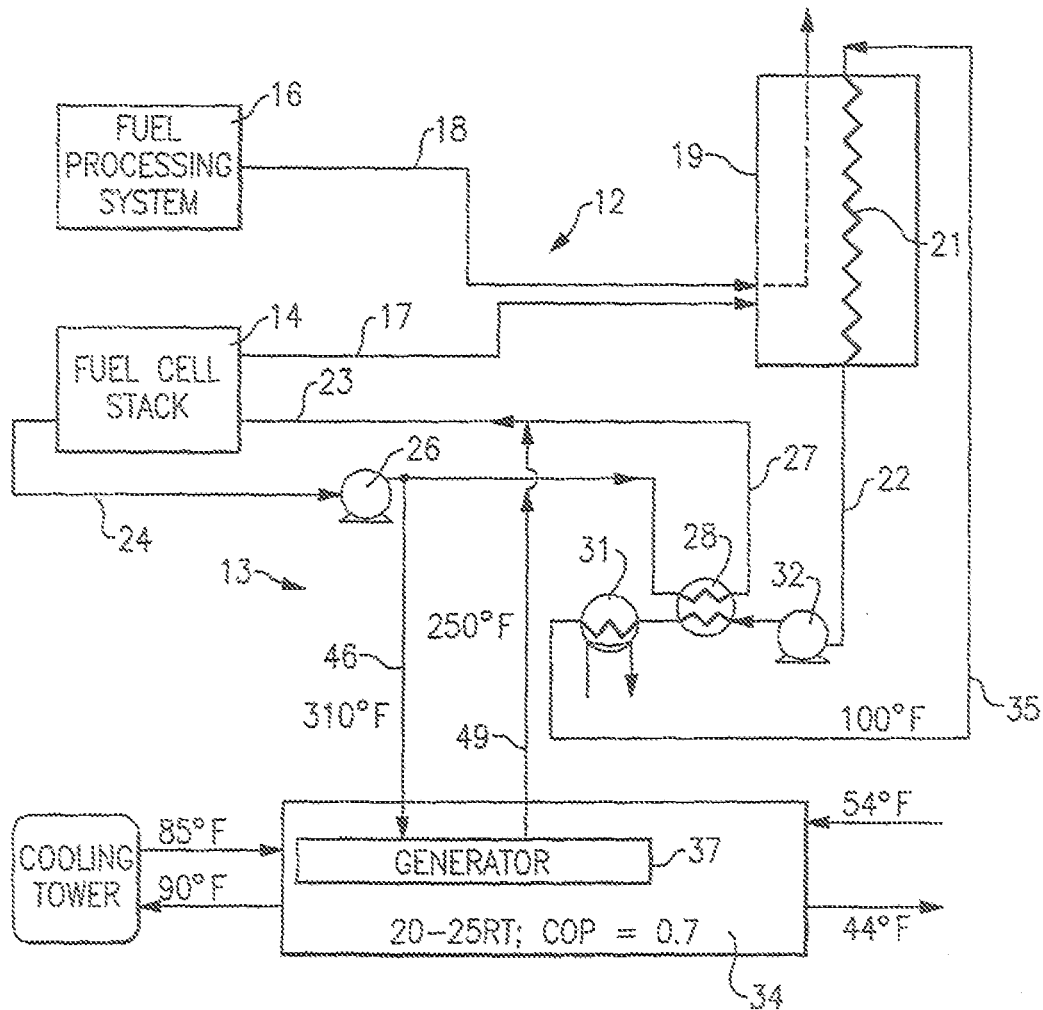
FIG. 4 is a schematic illustration of a fuel cell power plant as used in combination with a single effect absorption chiller in accordance with another embodiment of the invention.

The FIG. 4 embodiment is substantially the same as that of FIG. 3 except that the double effect absorption chiller 47 is replaced with a single effect absorption chiller 34 having a generator 37. Although this is the same absorption chiller that is used in the FIG. 1 embodiment, it should be recognized that, with the removal of the heat exchanger 29 and the application of the high grade heat liquid directly to the generator 37, greater efficiencies can be achieved to increase the capacity to 25 refrigeration tons with a COP of over 0.7. Further, the chiller of the FIG. 4 embodiment can be made cheaper than the chiller of the FIG. 2 embodiment because the heat exchanger for the generator 37 is less expensive since it is operated by employing higher temperatures and therefore does not have to operate as efficiently as the exchanger in the generator of the FIG. 2 embodiment.

It will be seen from the above discussion that, while the greatest efficiency can be obtained by the use of a double effect absorption chiller as shown in FIG. 3, it is still possible to use a single effect absorption chiller with the higher temperature coolant as shown in FIG. 4. However, there are some single effect absorption chillers that will not be sufficiently robust to allow the flow of high temperature coolant directly to the generator. In those cases, it may be necessary to adapt the apparatus as shown in FIG. 5.

Figure 5:
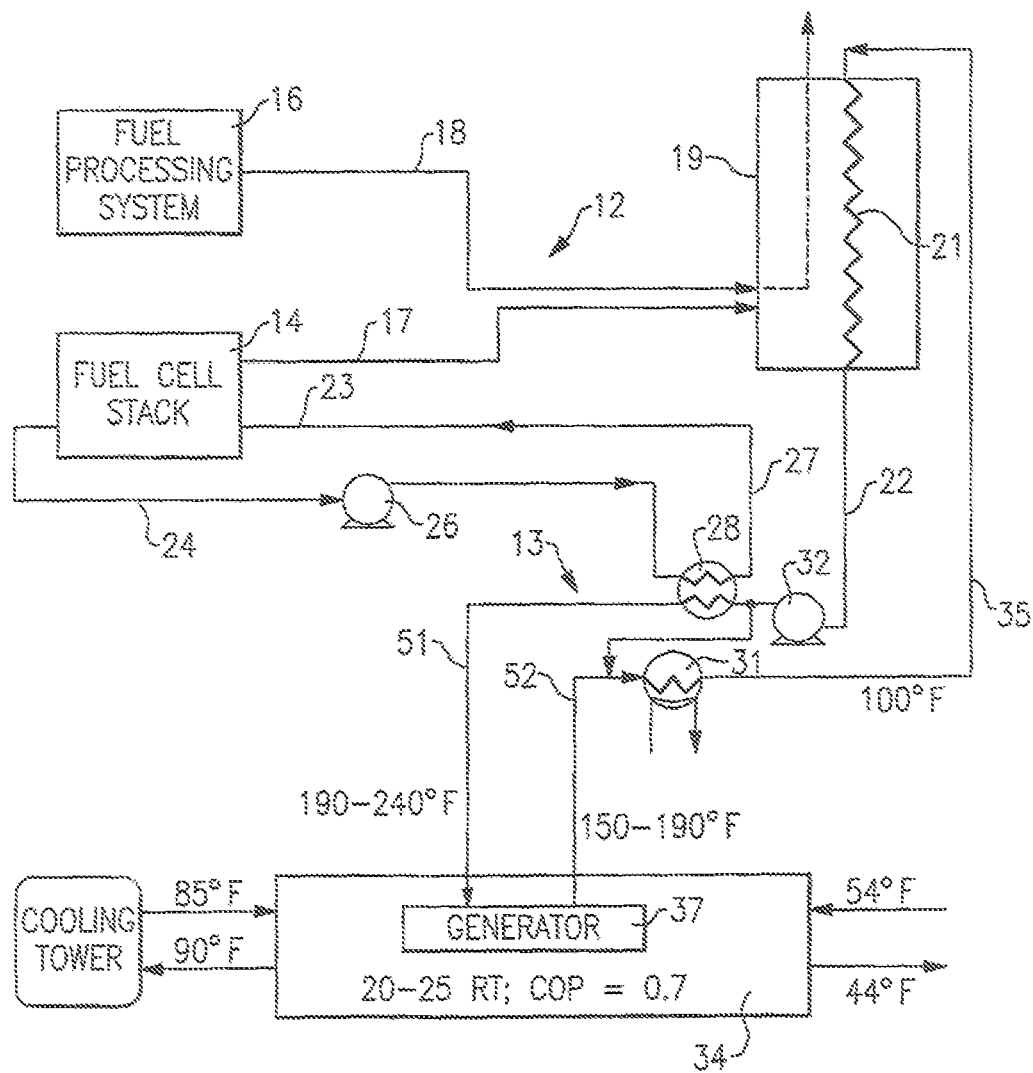
FIG. 5 is a schematic illustration of a fuel cell power plant as used in the combination with a single effect absorption chiller in accordance with yet another embodiment of the present invention.

In the FIG. 5 embodiment, the low grade heat coolant in the circulation loop 22, after picking up heat from the high grade heat loop 27, is made to flow directly into the generator 37 from the heat exchanger 28 by way of line 51. The temperature of that coolant is in the range of 190° F.-240° F. After passing through the generator 37, the coolant is passed to the heat exchanger 31 by way of line 52 and then along line 35 to the heat exchanger 21 as shown. Again, the efficiency is improved over the FIG. 1 embodiment and is substantially equal to that for the FIG. 4 embodiment. That is, it will provide a cooling capacity of around 25 refrigeration tons and a COP of over 0.7.

While the present invention has been particularly shown and described with reference to preferred and modified embodiments as illustrated in the drawings, it will be understood by one skilled in the art that various changes in detail may be effected therein without departing from the scope of the invention as defined by the claims. For example, although the preferred embodiment is described in terms of use with phosphoric acid fuel cells, other types of fuel cells such as solid oxide fuel cells, may also be used. Further, the invention is equally applicable to thermoelectrically activated technologies for the conversion of thermal energy to electricity. Also, even though described in terms of single effect and double effect absorption chillers, the invention would be equally applicable to triple effect absorption chillers.

We claim:

1. A fuel cell system, comprising:
   a cell stack assembly;
   a coolant loop including an outlet conduit for carrying fluid from the cell stack assembly, a heat exchanger coupled to the outlet conduit, and an inlet conduit for carrying fluid from the heat exchanger to the cell stack assembly;
   an absorption chiller having a generator for heating an absorptive solution;
   a supply conduit coupled to the outlet conduit between the cell stack assembly and the heat exchanger in a position where fluid from the outlet conduit enters the supply conduit after exiting the cell stack assembly and before encountering the heat exchanger, the supply conduit being in fluid communication with the outlet conduit for carrying at least some of the fluid in the outlet conduit away from the coolant loop to the absorption chiller generator; and
   a return conduit coupled to the inlet conduit between the heat exchanger and the cell stack assembly for carrying fluid from the absorption chiller generator to the inlet conduit.

2. The system of claim 1 wherein fluid in the supply conduit has a temperature in the range of 310-335° F.

3. The system of claim 1 wherein said absorption chiller comprises a double effect chiller having a first, high stage generator and a second, low stage generator and wherein the supply conduit is configured to carry the at least some fluid to the high stage generator.

4. The system of claim 1 wherein said absorption chiller is a single effect absorption chiller.

5. The system of claim 1 wherein said cell stack assembly comprises a plurality of phosphoric acid fuel cells.

* * * * *